United States Patent [19]

Petry

[11] 4,218,966
[45] Aug. 26, 1980

[54] BEVERAGE BREWER HOUSING STRUCTURE

[75] Inventor: Stanton H. Petry, Arlington Heights, Ill.

[73] Assignee: Cory Food Services, Inc., Chicago, Ill.

[21] Appl. No.: 34,848

[22] Filed: Apr. 30, 1979

[51] Int. Cl.³ .................... A47J 31/54; A47J 31/00
[52] U.S. Cl. .................................................. 99/295
[58] Field of Search ............... 99/279, 280, 281, 282, 99/283, 295, 300, 304, 307

[56] References Cited

U.S. PATENT DOCUMENTS

| | | | |
|---|---|---|---|
| 3,385,201 | 5/1968 | Martin | 99/295 |
| 3,443,508 | 5/1969 | Reynolds | 99/295 |
| 3,450,024 | 6/1969 | Martin | 99/295 |
| 3,740,231 | 6/1973 | Drwal | 99/307 |
| 3,771,432 | 11/1973 | Karlen | 99/307 |
| 3,978,778 | 9/1976 | Roberts | 99/281 |

*Primary Examiner*—Robert W. Jenkins
*Attorney, Agent, or Firm*—Wegner, Stellman, McCord, Wiles & Wood

[57] ABSTRACT

A beverage brewer housing structure wherein improved supporting connections are provided intermediate a base portion and the lower end of an upright rear portion of the housing and between the upper end of the upright rear portion and a cantilevered upper head portion of the housing. The connections are arranged so as to provide a plurality of layers of metal wall portions secured together to define improved rigidified interconnections between the housing portions advantageously adapted for use in such beverage brewer structures wherein relatively heavy weight is provided at the front end of the cantilevered head of the housing. The connections may include a plurality of channels and, in the illustrated embodiment, the channels include both C-section and L-section channels. The channels and interconnecting wall portions of the housing may be secured together by suitable threaded securing elements for facilitated low cost manufacture of the brewer structure.

12 Claims, 4 Drawing Figures

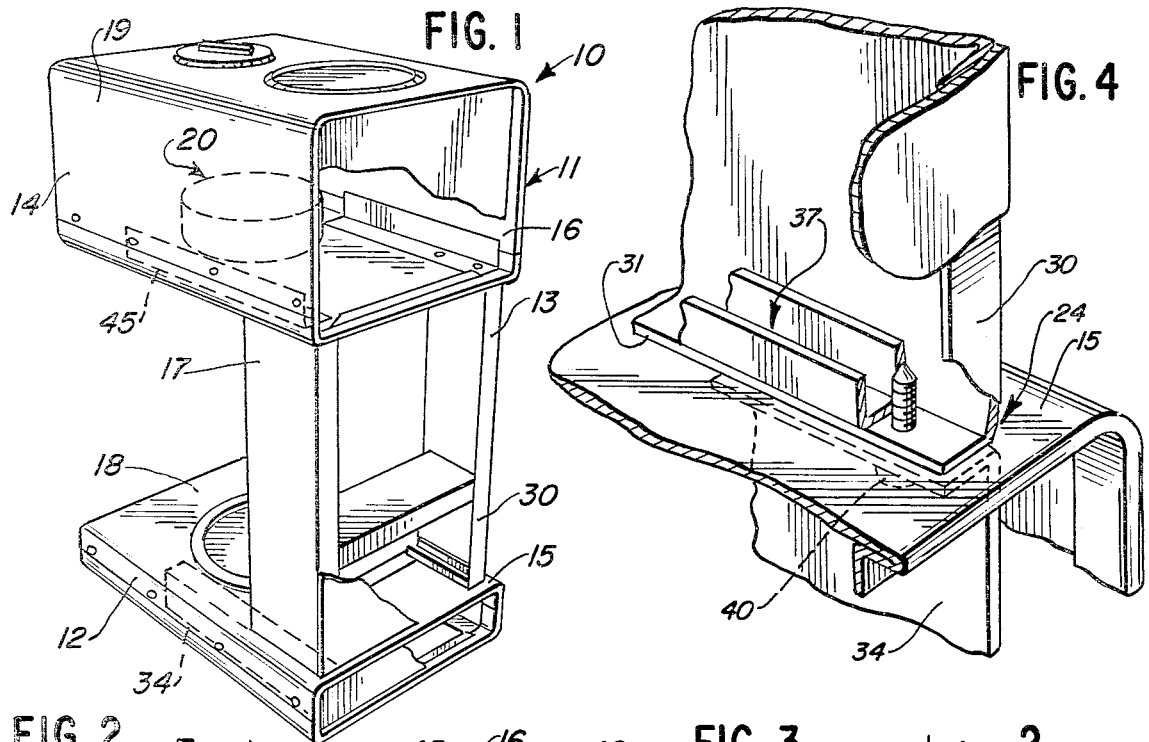
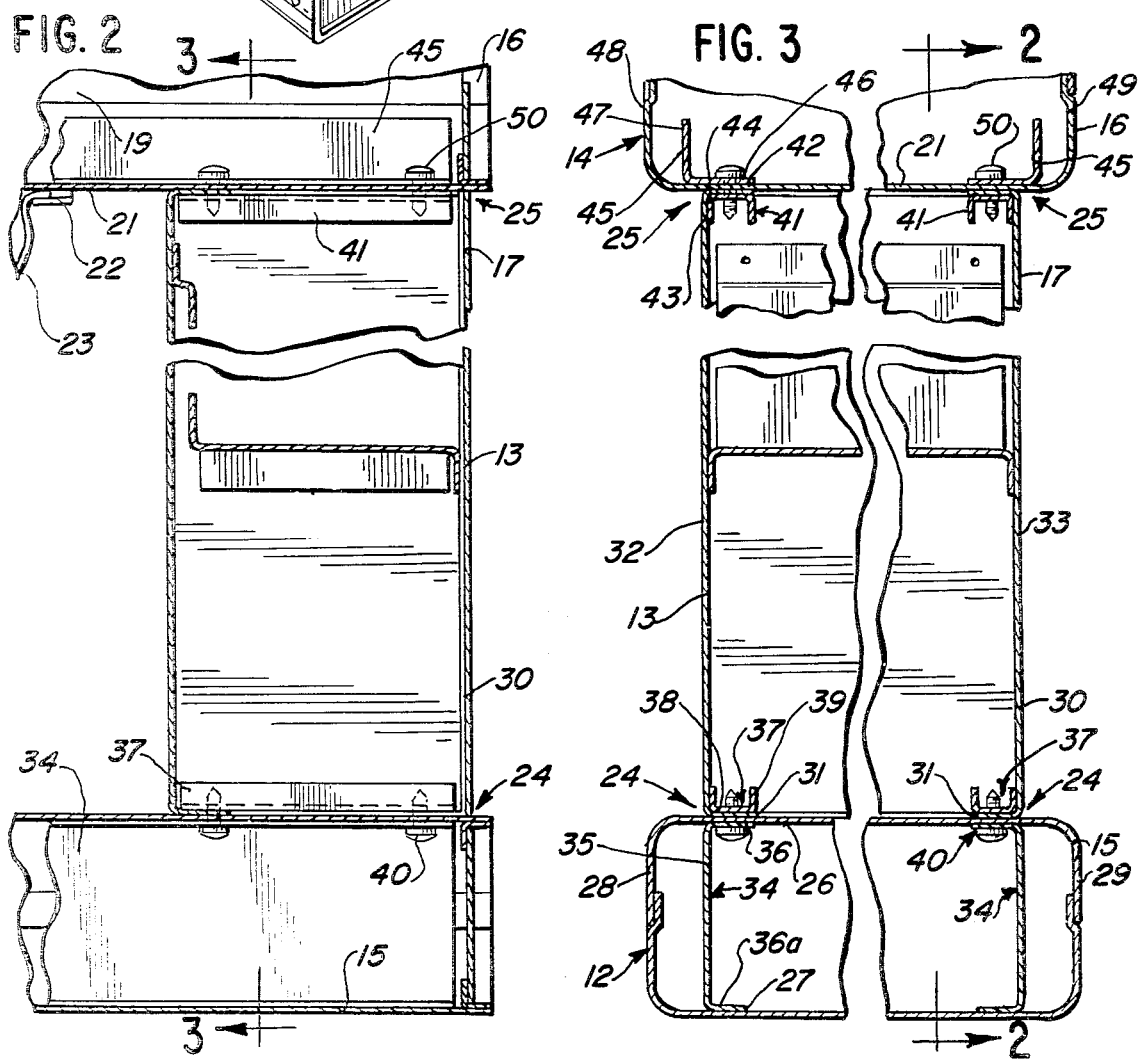

BEVERAGE BREWER HOUSING STRUCTURE

BACKGROUND OF THE INVENTION

1. Field of the Invention

This invention relates to beverage brewers and in particular to the manufacture of a multipart housing for use in a beverage brewer wherein a relatively heavy weight is provided at the front portion of a cantilevered head portion of the brewer.

2. Description of the Prior Art

In one conventional form of beverage brewer, such as a coffee brewer, a head portion is cantilevered from the upper end of a rear upright portion which, in turn, is carried on the rear of a base portion. Conventionally, the different portions of the housing may be formed integrally.

It is further conventional in the beverage brewer art to provide heating means generally in the rear portion of the head or in the upright to provide hot brewing water to a brewing cartridge which may be removably carried on the underside of the cantilevered front portion of the head. In one improved form of beverage brewer, the heating means comprises a massive heat exchanger element which effects a substantially instantaneous heating of the brewing water as it is delivered from a cold water supply in heat exchange relationship therewith for delivery to the brewing cartridge. Such instantaneous heating elements are relatively heavy, being conventionally comprised of massive metal bodies for effectively transferring heat from a heating element associated therewith to the brewing water flowed at a desired rate in heat exchange relationship therewith. Where the heavy heat exchange element is disposed forwardly of the upright in the cantilevered head, a problem arises in that this weight, together with the weight of the brewing cartridge which may have a substantial amount of brewing water temporarily retained therein in carrying out the brewing operation, places a substantial strain on the connection between the head and the upper end of the upright and between the lower end of the upright and the base where these housing portions comprise separate structures.

SUMMARY OF THE INVENTION

The present invention comprehends an improved means for interconnecting the head, upright and base in such a beverage brewer so as to provide an improved effectively positive support of the head on the base through the upright notwithstanding the relatively heavy weight carried by the front cantilevered portion of the head.

The connection between the lower end of the rear upright and the rear portion of the base may be effected through four layers of metal wall portions. In the illustrated embodiment, the metal wall portions thereat include a lower L-section channel, the upper wall of the base, an inturned flange on the lower end of the upright, and an upper C-section channel. These wall portions may be secured together by threaded securing means and cooperatively define an effective rigidifying connection between the lower end of the upright and the base.

The reinforcing channel within the base may extend substantially forwardly from the connection to the upright so as to provide an improved resistance to inclination of the upright from the desired vertical disposition.

The connection of the upper end of the upright to the rear end of the head may be defined by four wall portions including a C-section channel within the upper portion of the upright, an inturned flange on the upper end of the upright, the bottom wall of the head, and an uppermost L-section channel within the head. These metal wall portions may be secured together by suitable threaded securing means so as to define a four-metal wall interconnection between the head and the upright.

The channel within the head may extend substantially forwardly from the rear portion of the head overlying the upright so as to provide improved resistance to downward inclination of the head relative to the upright notwithstanding the substantial force exerted thereon by the weight carried by the front portion of the head.

The connection means in the housing structure of the present invention is extremely simple and economical of construction while yet providing a highly improved rigidified housing structure as discussed above.

BRIEF DESCRIPTION OF THE DRAWING

Other features and advantages of the invention will be apparent from the following description taken in connection with the accompanying drawing wherein:

FIG. 1 is a rear perspective view of a beverage brewer having improved housing connection means embodying the invention;

FIG. 2 is a fragmentary vertical section thereof taken substantially along the line 2—2 of FIG. 3;

FIG. 3 is a fragmentary vertical section taken substantially along the line 3—3 of FIG. 2; and FIG. 4 is a fragmentary further enlarged perspective section illustrating in greater detail one of the connections of the housing portions.

DESCRIPTION OF THE PREFERRED EMBODIMENT

In the exemplary embodiment of the invention as disclosed in the drawing, a beverage brewer structure generally designated 10 is shown to comprise a housing 11 including a base 12, a rear upright 13, and a head 14.

As shown in FIG. 1, upright 13 extends vertically upwardly from a rear portion 15 of base 12 and a rear portion 16 of head 14 is secured to the upper end 17 of the upright. Thus, head 14 is cantilevered forwardly from the upright in overlying relationship to a front portion 18 of base 12. The front portion 19 of head 14 may enclose heating means generally designated 20. Further, the bottom wall 21 may be provided with a suitable support 22 for removably carrying a brewing cartridge 23 of conventional construction.

The heating means 20 may comprise a relatively heavy mass of heat exchange material, such as metal, which may be suitably electrically heated for effectively instantaneously heating cold brewing water delivered thereto and delivering the thusly heated brewing water to the cartridge for brewing of the beverage therein. Resultingly, the weight of the heating means 20 and the brewing cartridge, together with brewing liquid temporarily retained therein during the brewing operation, imposes a substantial force on the forward portion 19 of head 14 tending to twist the connection between the head and upright 13 and the connection between the upright 13 and base 12. The present invention is concerned with an improved means for rigidifying the connection so as to effectively resist such twisting action and maintaining the desirable perpendicular relationship between the base, upright, and head, as shown in FIG. 1.

More specifically, the invention comprehends the provision of connecting means 24 for connecting the lower end of upright 13 to the rear portion 15 of base 12, and the provision of connecting means generally designated 25 for connecting the upper end 17 of support 13 to the rear portion 16 of head 14.

As shown, base 12 comprises a hollow structure having a top wall 26, a bottom wall 27, a left sidewall 28 and a right sidewall 29. Lower end 30 defines inturned flanges 31 extending from the left sidewall 32 and right sidewall 33 thereof, respectively. As shown in FIG. 3, flanges 31 rest on the upper wall 26 of base 12 inwardly of the sidewalls 28 and 29 of the base.

A pair of first channels 34 are provided within the base for rigidifying connection 24 therein. More specifically, each channel 34 defines a downwardly extending leg 35, an upper turned, horizontal leg 36, and a lower turned, horizontal leg 36a. As shown in FIG. 3, the downwardly extending legs are spaced inwardly from the sidewalls of the base 12 and extend downwardly to the bottom wall 27. The legs 34 may be disposed to be substantially coplanar with the sidewalls 32 and 33, as shown in FIG. 3.

The connecting means 24 further includes second C-section, channels 37. Channels 37 define bight portions 38 resting on the inturned flanges 31 of upright 13 and legs 39 extending upwardly therefrom.

Threaded securing means 40 are provided for securing the connections 24 and, more specifically, as shown in FIG. 3, may comprise screws extending upwardly through the legs 36 of channel 34, upper wall 26 of base rear portion 15, flanges 31 of upright lower portion 30, and bights 38 of channel 37. Thus, the connecting means 24 are effectively defines by four metal wall thicknesses to provide a rigid reinforced connection between the base and upright, permitting the case and upright to be formed of relatively thin sheet metal while yet avoiding twisting and distortion thereof as from the substantial forces applied to the forward end of the cantilevered head in the normal use of the apparatus.

As seen in FIG. 1, channels 34 may extend forwardly from base rear portion 15 into the forward portion 18 thereof so as to provide further rigidified reinforcement of the connection of upright 13 to the base.

Upper connections 25 may include a first pair of channels 41 which, as shown in FIG. 3, may comprise third C-section channels having a bight 42 and spaced legs 43 extending downwardly from the bight with bight 42 facially engaging an inturned flange 44 at the upper end of upright portion 17.

The upper connections further include L-section channels 45 having a horizontal leg 46 overlying the bottom wall 21 of head portion 16. The channels 45 further include vertically upwardly extending legs 47 spaced inwardly of the sidewalls 48 and 49 of the head.

Threaded securing means 50 are provided for securing the upper connections 25 and, more specifically, define, as shown in FIG. 3, screws extending downwardly successively through the upper channel legs 46, head bottom wall 21, upright inturned flanges 44, and bight 42 of channel 41. Resultingly, the connecting means 25 are defined by four metal wall portions rigidly secured together by the securing means 50 to provide a rigid reinforced connection of the rear portion 16 of head 14 to the upper portion 17 of upright 13 for resisting twisting and deformation forces, such as from the weight applied to front portion 19 of the head 14.

As shown in FIG. 1, the channels 45 may extend forwardly from the rear portion 16 of head 14 into the front portion 19 to provide further rigid reinforcement of the connection. Thus, head 14 may be formed of relatively thin sheet metal for improved economy and light weight of the brewer structure while yet the improved connecting means 25 effectively assures a maintained perpendicular relationship between the upright 13 and head 14 notwithstanding the substantial forces applied to the cantilevered front portion 19 thereof.

The foregoing disclosure of specific embodiments is illustrative of the broad inventive concepts comprehended by the invention.

I claim:

1. In a beverage brewer having a brewing head defining a rear portion and a front portion and having a massive instantaneous heat transfer device for effectively heating cold supply water to brewing temperature, and means for removably supporting a brewing cartridge on the brewing head to receive the heated water for brewing a beverage therein, improved means for supporting the brewing head comprising:

a hollow substantially flat base defining a front portion and a rear portion, said base including a bottom wall and a top wall;

a hollow rear upright having a lower end defining inturned flanges resting on said base rear portion and an upper end supporting said head rear portion;

a first pair of C-section channels in said base rear portion, one each at opposite sides of the base rear portion and each having a lower turned flange abutting said base bottom wall, and an upper turned flange abutting the underside of said base top wall, said flanges of the pair of channels extending toward each other;

a second pair of C-section channels in said upright lower end and opening upwardly one each at the opposite sides thereof in overlying relationship to said turned flanges of said pair of L-section channels, said C-section channels each defining a bight portion resting on said upright inturned flanges and an outer leg portion juxtaposed to the adjacent side of the upright; and threaded securing means securing the flange of each said first C-section channel to the bight of the overlying second C-section channel through the base top wall whereby said pair of second C-section channels and upright inturned flanges are effectively supported on said base top wall and said base top wall is reinforced by said pair of first C-section channels, each of said first C-section channels, base top wall, second C-section channels, and upright inturned flanges defining a metal wall portion whereby the connection of the upright to the base is defined by four layers of metal wall portions.

2. The beverage brewer structure of claim 1 wherein said pair of first C-section channels define a front end underlying said heat transfer device.

3. The beverage brewer structure of claim 1 wherein said pair of first C-section channels have a length less than that of said base and define a front end underlying said heat transfer device.

4. The beverage brewer structure of claim 1 wherein said base defines opposite vertical sidewalls and said pair of first C-section channels are spaced inwardly thereof.

5. The beverage brewer structure of claim 1 wherein said upright defines opposite sidewalls and said pair of first C-section channels define vertical portions substantially coplanar with said upright sidewalls.

6. In a beverage brewer having a brewing head defining a rear portion and a front portion, said head defining a bottom wall and having a massive instantaneous heat transfer device for effectively heating cold supply water to brewing temperature, and means for removably supporting a brewing cartridge on the brewing head to receive the heated water for brewing a beverage therein, improved means for supporting the brewing head comprising:

a hollow substantially flat base defining a front portion and a rear portion, said base including a bottom wall and a top wall;

a hollow rear upright having a lower end defining inturned flanges resting on said base rear portion and an upper end supporting said head rear portion;

a front pair of C-section channels in said base rear portion, one each at opposite sides of the base rear portion and each having a lower turned flange abutting said base bottom wall, and an upper turned flange abutting the underside of said base top wall, said flanges of the pair of channels extending toward each other;

a rear pair of C-section channels in said upright lower end and opening upwardly one each at the opposite sides thereof in overlying relationship to said turned flanges of said pair of front C-section channels, said second C-section channels each defining a bight portion resting on said upright inturned flanges and an outer leg portion juxtaposed to the adjacent side of the upright;

a pair of L-section channels in said head rear portion, one each at opposite sides thereof;

a third pair of C-section channels underlying said head bottom wall; and threaded securing means securing the pair of L-section channels and third pair of C-section channels to the upright upper end through said head bottom wall.

7. The beverage brewer structure of claim 6 wherein said pair of L-section channels have upright leg portions spaced inwardly of the opposite sides of the head.

8. The beverage brewer structure of claim 6 wherein said pair of L-section channels extend partially into said head front portion.

9. The beverage brewer structure of claim 6 wherein said pair of L-section channels have a length substantially equal to that of said first pair of C-section channels.

10. The beverage brewer structure of claim 6 wherein each of said second and third channels defines a rear end disposed substantially at a common vertical plane.

11. The beverage brewer structure of claim 6 wherein each of said second and third channels defines a rear end disposed substantially at a common vertical plane defined by a rear wall of said upright.

12. The beverage brewer structure of claim 6 wherein said upright defines inturned flanges at the top thereof, said inturned flanges being disposed between said third pair of C-section channels and said head bottom wall, each of said pair of L-section channels, said spaced pair of C-section channels, said head bottom wall, and said inturned flanges define a vertical wall portion whereby the connection of the head to the upright is defined by four layers of metal wall portions.

* * * * *